US 12,493,777 B2

(12) United States Patent
Hong et al.

(10) Patent No.: US 12,493,777 B2
(45) Date of Patent: Dec. 9, 2025

(54) DATA PROCESSING METHOD AND APPARATUS FOR EXCUTING NEURAL NETWORK ON ACCELERATOR

(71) Applicant: SAMSUNG ELECTRONICS CO., LTD., Suwon-si (KR)

(72) Inventors: Hyesun Hong, Seoul (KR); Jaehyung Ahn, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 932 days.

(21) Appl. No.: 17/241,380

(22) Filed: Apr. 27, 2021

(65) Prior Publication Data

US 2022/0121912 A1    Apr. 21, 2022

(30) Foreign Application Priority Data

Oct. 21, 2020   (KR) .................. 10-2020-0136623

(51) Int. Cl.

| | |
|---|---|
| *G06N 20/10* | (2019.01) |
| *G06F 9/50* | (2006.01) |
| *G06N 3/045* | (2023.01) |
| *G06N 3/063* | (2023.01) |

(52) U.S. Cl.
CPC .......... *G06N 3/063* (2013.01); *G06F 9/5027* (2013.01); *G06N 3/045* (2023.01); *G06N 20/10* (2019.01)

(58) Field of Classification Search
CPC ........ G06N 3/063; G06N 3/045; G06N 20/10; G06N 3/08; G06N 3/04; G06F 9/5027; G06F 9/5055; G06F 2209/509; G06F 2209/501; G06F 2209/5013; G06F 9/28; G06F 9/5077

See application file for complete search history.

(56) References Cited

U.S. PATENT DOCUMENTS

| | | | |
|---|---|---|---|
| 9,558,094 B2 | 1/2017 | Zhou | |
| 2012/0320070 A1* | 12/2012 | Arvo ..................... | G06F 9/5033 345/522 |
| 2015/0324707 A1* | 11/2015 | Zhou ..................... | G06N 20/00 717/124 |

(Continued)

FOREIGN PATENT DOCUMENTS

| | | |
|---|---|---|
| JP | 6511025 B2 | 5/2019 |
| KR | 10-2018-0052069 A | 5/2018 |

(Continued)

OTHER PUBLICATIONS

Olston, Christopher, et al. "Tensorflow-serving: Flexible, high-performance ml serving." arXiv preprint arXiv:1712.06139 (2017) (8 pages in English).

(Continued)

*Primary Examiner* — Reji Kartholy
(74) *Attorney, Agent, or Firm* — NSIP Law

(57) ABSTRACT

A processor-implemented data processing method includes: receiving a request for executing a neural network model on an accelerator; generating a plurality of candidate kernels for each of a plurality of layers comprised in the model; and allocating, to the accelerator, a single candidate kernel that is selected from among a plurality of candidate kernels for a layer to run on the accelerator based on corresponding kernel information and status information of the accelerator.

20 Claims, 14 Drawing Sheets

(56) References Cited

U.S. PATENT DOCUMENTS

| | | | |
|---|---|---|---|
| 2016/0328644 A1 | 11/2016 | Lin et al. | |
| 2017/0344882 A1* | 11/2017 | Ambrose | G06N 3/045 |
| 2020/0234146 A1 | 7/2020 | Lee et al. | |
| 2020/0301739 A1* | 9/2020 | Xu | G06N 3/063 |
| 2021/0149729 A1* | 5/2021 | Wang | G06F 9/5016 |
| 2021/0373944 A1 | 12/2021 | Lee et al. | |
| 2022/0398456 A1* | 12/2022 | Gao | G06V 10/96 |

FOREIGN PATENT DOCUMENTS

| | | |
|---|---|---|
| KR | 10-2020-0049366 A | 5/2020 |
| KR | 10-2020-0065626 A | 6/2020 |

OTHER PUBLICATIONS

Nvidia, "Multi-Process Service", vR450, Jun. 2020 (28 pages in English).

Li, Jiajun, et al. "Smartshuttle: Optimizing off-chip memory accesses for deep learning accelerators." 2018 Design, Automation & Test in Europe Conference & Exhibition (Date). IEEE, 2018 (6 pages in English).

Park, Jason Jong Kyu, Yongjun Park, and Scott Mahlke. "Chimera: Collaborative preemption for multitasking on a shared GPU." ACM SIGARCH Computer Architecture News 43.1 (2015): 593-606 (14 pages in English).

"Nvidia Multi-Instance GPU User Guide", Nvidia, Apr. 2021 (37 pages in English).

Van Werkhoven, Ben, et al. "Optimizing Convolution Operations in CUDA with Adaptive Tiling." *Department of Computer Science, VU University De Boelelaan 1081A, 1081 IIV Amsterdam, The Netherlands* 2011 (12 pages in English).

Van Werkhoven, Ben, et al. "Optimizing convolution operations on GPUs using adaptive tiling." *Future Generation Computer Systems* vol. 14 Issue 26 2014 (13 pages in English).

Zheng, Lianmin, et al. "Automatic Kernel Optimization for Deep Learning on All Hardware Platforms" https://tvm.apache.org/2018/10/03/auto-opt-all Oct. 3, 2018 (6 pages in English).

Van Werkhoven, Ben. "Kernel Tuner: A search-optimizing GPU code auto-tuner." *Future Generation Computer Systems* 90 vol. 347 Issue 358 2019 (12 pages in English).

Extended European Search Report issued on Jan. 4, 2022 in counterpart European Patent Application No. 21182635.9 (13 pages in English).

* cited by examiner

|  | Layer 1 | Layer 2 | ... |
|---|---|---|---|
| Model 1 | Kernel 1 (3, IF, (8, 1, 2, 2))<br>Kernel 2 (5, IF, (10, 1, 3, 3))<br>Kernel 3 (3, W, (4, 1, 8, 8))<br>Kernel 4 (3, OF, (4, 1, 8, 8))<br>... | Kernel 1 (10, IF, (8, 4, 5, 5))<br>Kernel 2 (10, W, (4, 9, 1, 1))<br>Kernel 3 (2, OF, (4, 4, 2, 2))<br>... | ... |
| Model 2 | Kernel 1 (2, IF, (10, 64, 30, 30))<br>Kernel 2 (2, W, (128, 64, 13, 13))<br>Kernel 3 (2, OF, (128, 14, 20, 20))<br>... | | ... |

FIG.3

DATA PROCESSING METHOD AND APPARATUS FOR EXCUTING NEURAL NETWORK ON ACCELERATOR

CROSS-REFERENCE TO RELATED APPLICATIONS

This application claims the benefit under 35 USC § 119(a) of Korean Patent Application No. 10-2020-0136623, filed on Oct. 21, 2020, in the Korean Intellectual Property Office, the entire disclosure of which is incorporated herein by reference for all purposes.

BACKGROUND

1. Field

The following description relates to a data processing method and apparatus.

2. Description of Related Art

Artificial Intelligence (AI) technology may perform inference and learning through a specific arithmetic operation. Various devices may be dedicated hardware to implement and execute the AI.

Dedicated hardware for AI may be implemented by, for example, a central processing unit (CPU) and a graphics processing unit (GPU) and may also be implemented by a field programmable gate array (FPGA) and an application specific integrated circuit (ASIC).

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a processor-implemented data processing method includes: receiving a request for executing a neural network model on an accelerator; generating a plurality of candidate kernels for each of a plurality of layers comprised in the model; and allocating, to the accelerator, a single candidate kernel that is selected from among a plurality of candidate kernels for a layer to run on the accelerator based on corresponding kernel information and status information of the accelerator.

The generating may include generating the plurality of candidate kernels to run each layer using a different accelerator resource use amount.

The generating may include generating the plurality of candidate kernels such that, for each of the plurality of candidate kernels, any one or any combination of a number of cores, a data reuse pattern, and a tiling factor used when a corresponding layer of the candidate kernel runs on the accelerator is different than that used when a corresponding layer of another one of the candidate kernels runs on the accelerator.

A number of cores used to execute the model among a plurality of cores comprised in the accelerator may vary based on a resource situation of the accelerator in a run time.

The allocating may include: selecting, as the single candidate kernel, a single candidate kernel configured to maximize a utilization rate of the accelerator in a resource situation of the accelerator from among the plurality of candidate kernels; and allocating the selected candidate kernel to a remaining resource of the accelerator.

The status information of the accelerator may include any one or any combination of resource use information of the accelerator, kernel information of a layer running on the accelerator, and information about a subsequent layer of the layer running on the accelerator.

The allocating may include selecting the candidate kernel based on a determined occurrence or non-occurrence of a collision with a data access pattern of a layer of the model running on the accelerator and allocating the selected candidate kernel to the accelerator.

The allocating may include: selecting, as the candidate kernel, either one of a candidate kernel that meets quality of service (QoS) of either one of the layer running and a layer to run on the accelerator, and a candidate kernel, from among the plurality of candidate kernels, that has a least effect on the QoS in response to the occurrence of the collision; and allocating the selected candidate kernel to the accelerator.

The allocating may include either one of: allocating the single candidate kernel in response to completing one of at least one layer of the model running on the accelerator; and allocating the single candidate kernel in response to receiving a new request and executing a model corresponding to the new request using a remaining resource of the accelerator.

The allocating may be performed by either one of a host processor configured to generate the plurality of candidate kernels and the accelerator that executes the model.

The allocating may include allocating, as the single candidate kernel, a single candidate kernel that is selected from among the plurality of candidate kernels based on any one of a greedy scheme, an equal resource distribution scheme, an overall system performance prioritization scheme, and a power consumption minimization scheme.

The accelerator may include a plurality of cores and may be configured to execute at least one model.

The method may include generating at least a portion of an output feature map by running, using the accelerator, a layer of the model based on the allocated single candidate kernel.

A non-transitory computer-readable record medium may store instructions that, when executed by one or more processors, configure the one or more processors to perform the method.

In another general aspect, a data processing apparatus includes: one or more processors configured to: receive a request for executing a neural network model on an accelerator; generate a plurality of candidate kernels for each of a plurality of layers comprised in the model; and allocate, to the accelerator, a single candidate kernel that is selected from among a plurality of candidate kernels for a layer to run on the accelerator based on corresponding kernel information and status information of the accelerator.

In another general aspect, an electronic device includes: a host processor configured to receive a request for executing a neural network model on an accelerator and to generate a plurality of candidate kernels for each of a plurality of layers comprised in the model; and the accelerator configured to run a layer determined to be run based on a single candidate kernel that is selected from among a plurality of candidate kernels for the layer to run based on corresponding kernel information and status information of the accelerator.

For the generating, the host processor may be configured to generate the plurality of candidate kernels to run each layer using a different accelerator resource use amount.

In another general aspect, a processor-implemented data processing method includes: generating a plurality of kernels for each of a first neural network model and a second neural network model; and running a kernel of the first model on a number of cores of an available resource of an accelerator; in response to a start of the running, running a kernel of the second model on a remaining number of cores of the available resource of an accelerator; generating one or more output feature maps based on the running of the kernels.

The running of the kernel of the second model may include running the kernel of the second model in response to determining that a collision will not occur between memory access patterns during the running of the kernel of the first model and the running of the kernel of the second model.

For each of the kernel of the first model and the kernel of the second model, the kernel may be selected for running from among the plurality of kernels based on kernel information including any one or more of: a number of accelerator cores used to run the kernel; a data reuse pattern including any one or more of a reuse of an input feature map, a reuse a weight, and a reuse of an output feature map in running the kernel; and a tiling factor including a multi-dimensional data size of the kernel.

Other features and aspects will be apparent from the following detailed description, the drawings, and the claims.

BRIEF DESCRIPTION OF THE DRAWINGS

FIG. 3 illustrates an example of kernel information.

Figure 1:
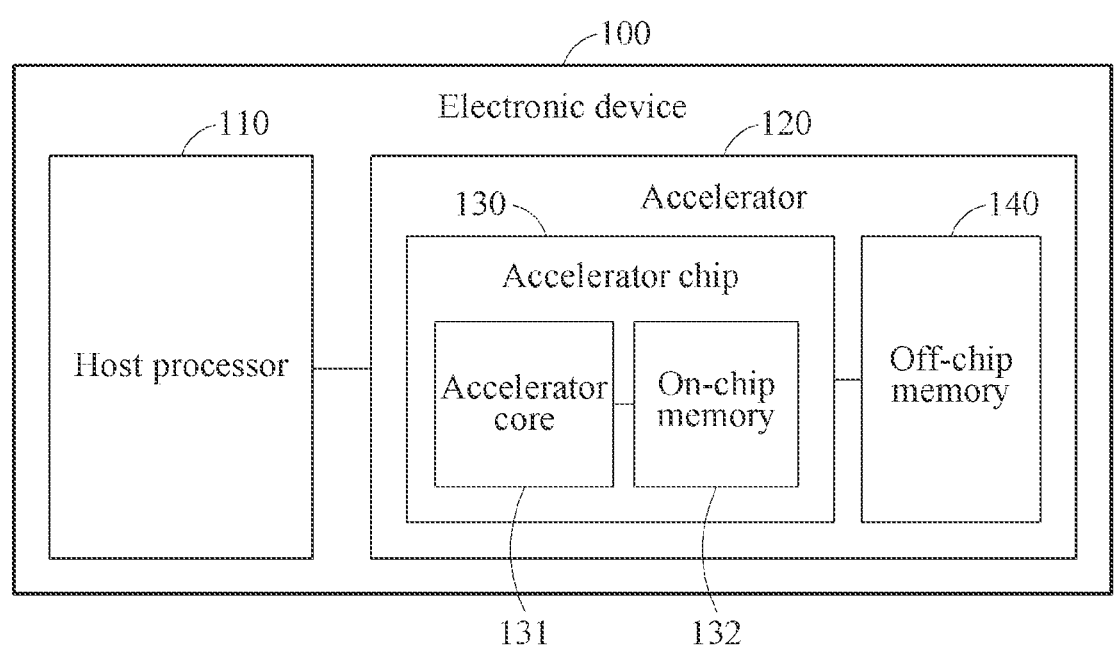
FIG. 1 illustrates an example of an electronic device.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art, after an understanding of the disclosure of this application, may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The following structural or functional descriptions of examples disclosed in the present disclosure are merely intended for the purpose of describing the examples and the examples may be implemented in various forms. The examples are not meant to be limited, but it is intended that various modifications, equivalents, and alternatives are also covered within the scope of the claims.

Although terms of "first" or "second" are used to explain various members, components, regions, layers, or sections, the members, components, regions, layers, or sections are not limited to the terms. These terms should be used only to distinguish one member, component, region, layer, or section from another member, component, region, layer, or section. For example, a "first" member, component, region, layer, or section referred to in examples described herein may be referred to as a "second" member, component, region, layer, or section, or similarly, and the "second" member, component, region, layer, or section may be referred to as the "first" member, component, region, layer, or section within the scope of the right according to the concept of the present disclosure.

Throughout the specification, it will be understood that when a component or element is referred to as being "on," "connected to" or "coupled to" another component or element, it may be directly on, connected to, or coupled to the other component or element, or there may be one or more intervening elements therebetween. In contrast, when a component or element is referred to as being "directly on," "directly connected to," or "directly coupled to" another component or element, there are no intervening components or elements present. Likewise, expressions, for example, "between" and "immediately between" and "adjacent to" and "immediately adjacent to" may also be construed as described in the foregoing.

The terminology used herein is for the purpose of describing particular examples only and is not to be limiting of the present disclosure. As used herein, the singular forms "a", "an", and "the" are intended to include the plural forms as well, unless the context clearly indicates otherwise. As used herein, the term "and/or" includes any one and any combination of any two or more of the associated listed items. As used herein, the terms "include," "comprise," and "have" specify the presence of stated features, integers, steps, operations, elements, components, numbers, and/or combinations thereof, but do not preclude the presence or addition of one or more other features, integers, steps, operations, elements, components, numbers, and/or combinations thereof. The use of the term "may" herein with respect to an example or embodiment (for example, as to what an example or embodiment may include or implement) means that at least one example or embodiment exists where such a feature is included or implemented, while all examples are not limited thereto.

Unless otherwise defined, all terms including technical or scientific terms used herein have the same meaning as commonly understood by one of ordinary skill in the art to which examples belong. It will be further understood that terms, such as those defined in commonly-used dictionaries, should be interpreted as having a meaning that is consistent with their meaning in the context of the relevant art and the present disclosure, and will not be interpreted in an idealized or overly formal sense unless expressly so defined herein.

Hereinafter, examples will be described in detail with reference to the accompanying drawings, and like reference numerals in the drawings refer to like elements throughout. Further description related thereto is omitted.

FIG. 1 illustrates an example of an electronic device.

Referring to FIG. 1, an electronic device 100 may include a host processor 110 and an accelerator 120. The host processor 110 and the accelerator 120 may communicate with each other through a bus, network on a chip (NoC), peripheral component interconnect express (PCIe), and the like.

The host processor 110 may be an apparatus configured to control operations of components included in the electronic device 100 and may be or include, for example, a central processing unit (CPU). The host processor 110 may receive at least one request for processing a neural network at the accelerator 120 and, in response to the request, generate a kernel that includes instructions executable at the accelerator 120. The request may be for data inference based on the neural network and may cause the accelerator 120 to execute, that is, run (hereinafter, the terms "execute" and "run" and modifications thereof may be interchangeably used) the neural network and to acquire a data inference result for, for example, an object recognition, a pattern recognition, a computer vision, a voice recognition, a machine translation, a machine interpretation, a recommendation service, a personalized service, a video processing, and/or autonomous driving. Also, the request may be for learning of the neural network and to train the neural network that performs the aforementioned operation based on learning data. Although description is made based on data inference for clarity of description, the description may also apply without excluding the data learning. The host processor 110 may transfer data to be inferred and/or a kernel for executing the neural network to the accelerator 120.

The accelerator 120 may be an artificial intelligence (AI) accelerator configured to infer data by executing the neural network based on the kernel transferred from the host processor 110 and may be a separate processor distinguished from the host processor 110. For example, the accelerator 120 may be a neural processing unit (NPU), a graphical processing unit (GPU), a tensor processing unit (TPU), and/or a digital signal processor (DSP).

The accelerator 120 may be a separate dedicated processor that processes certain tasks more efficiently than the universal host processor 110, due to characteristics of operations according to the neural network. Here, an accelerator core 131 and an on-chip memory 132 included in an accelerator chip 130 may be used.

The accelerator core 131 may include one or more processing elements (PEs) configured to perform operations according to the neural network. Although FIG. 1 illustrates that a single accelerator core 131 is included in the accelerator chip 130 for clarity of description, a plurality of accelerator cores may be included in the accelerator chip 130 and may process operations according to one or more neural networks requested. In a non-limiting example, the accelerator core 131 may include the plurality of cores. Herein, for clarity of description, the accelerator core 131 may also be referred to as a core.

The on-chip memory 132 may be a device including a global shared buffer and/or a local buffer included in the accelerator chip 130 and configured to store data required for the accelerator core 131 to perform an operation or to store an operation performance result, and may be distinguished from an off-chip memory 140. For example, the on-chip memory 132 may include a static random access memory (SRAM) and/or a scratchpad memory accessible through an address space. In a non-limiting example, the on-chip memory 132 may include a plurality of on-chip memories, each corresponding to a respective one of the plurality of cores.

The off-chip memory 140 may be a memory provided outside the accelerator chip 130, and may be, for example, a dynamic random access memory (DRAM) and/or a high bandwidth memory (HBM). However, it is provided as an example only and the off-chip memory 140 is not limited thereto. The off-chip memory 140 may store data to be inferred and/or parameters of the neural network to be executed by the accelerator core 131. The stored data may be transferred to the accelerator core 131 to perform inference. The off-chip memory 140 may be used when the on-chip memory 132 included in the accelerator chip 130 is insufficient to execute the neural network on the accelerator core 131.

The off-chip memory 140 may have a memory capacity greater than that of the on-chip memory 132 in the accelerator core 131. However, when executing the neural network, cost used for the accelerator core 131 to access the off-chip memory 140 may be greater than cost used for the accelerator core 131 to access the on-chip memory 132. The memory access cost may represent power and/or time used to read or write data through access to a corresponding memory.

The neural network may provide an optimal output corresponding to an input by mapping an input and an output having a nonlinear relationship based on deep learning. The deep learning may be a machine learning scheme for solving a given problem from a big data set and may be a process of finding a model and parameters (for example, a weight of a kernel) that represent a structure of the neural network and optimizing the neural network. The neural network may include a plurality of layers (for example, an input layer, a plurality of hidden layers, and an output layer). Each of layers may include a plurality of nodes. Each of the nodes may be a computation unit having at least one input and output and the nodes are interconnected. A weight may be set to a connection between nodes and the weight may be adjusted or changed. Effect of a corresponding data value that affects a final result may be determined by increasing, decreasing, or maintaining the corresponding data value using the weight. Weighted inputs of nodes included in a previous layer may be input to each of nodes included in an output layer. A process in which weighted data is input from a layer to a subsequent layer is referred to as a propagation.

In one example, in response to a plurality of requests received at the host processor 110, the accelerator 120 may execute a plurality of neural networks according to kernels generated by the host processor 110. Here, the plurality of neural networks executed on the accelerator 120 may be neural networks in different structures. Alternatively, the same neural network may be executed a plurality of number of times. In the case of simply executing the plurality of neural networks in request order, it may be difficult for a typical electronic device and/or a host processor to decrease an idle time in which hardware resources of the accelerator 120 are not used in the middle of execution due to workload characteristics of each neural network and there may occur tail-latency that a later received request is delayed during processing of a preceding request. To prevent a degradation in a utilization rate of the accelerator 120, scheduling for the plurality of neural networks may be performed by the electronic device 100 and/or the host processor 110 of one or more embodiments. In particular, in response to a request for executing the plurality of neural networks, the electronic device 100 and/or the host processor 110 of one or more embodiments may improve the utilization rate of the accelerator 120 by minimizing an idle time occurring in the middle of execution by allocating a resource for processing each neural network based on a situation of the accelerator 120. Herein, a neural network may also be referred to as a model for clarity of description.

The examples of one or more embodiments described herein may generate a plurality of candidate kernels for running a specific layer on the accelerator 120, and may select and run a single candidate kernel capable of most efficiently using a resource of the accelerator 120 from among the plurality of candidate kernels. In this manner, even when a plurality of models is executed on the accelerator 120, the electronic device 100 and/or the host processor 110 of one or more embodiments may improve performance by minimizing contention between the models and by maximizing a resource utilization rate of the accelerator 120. Since the plurality of models is concurrently executed, the utilization rate of the accelerator 120 may be degraded. The examples of one or more embodiments may select a kernel capable of most efficiently using the accelerator 120 in a run time and thereby minimize the contention between the models and maximize the resource use, thereby improving the performance.

Figure 2:
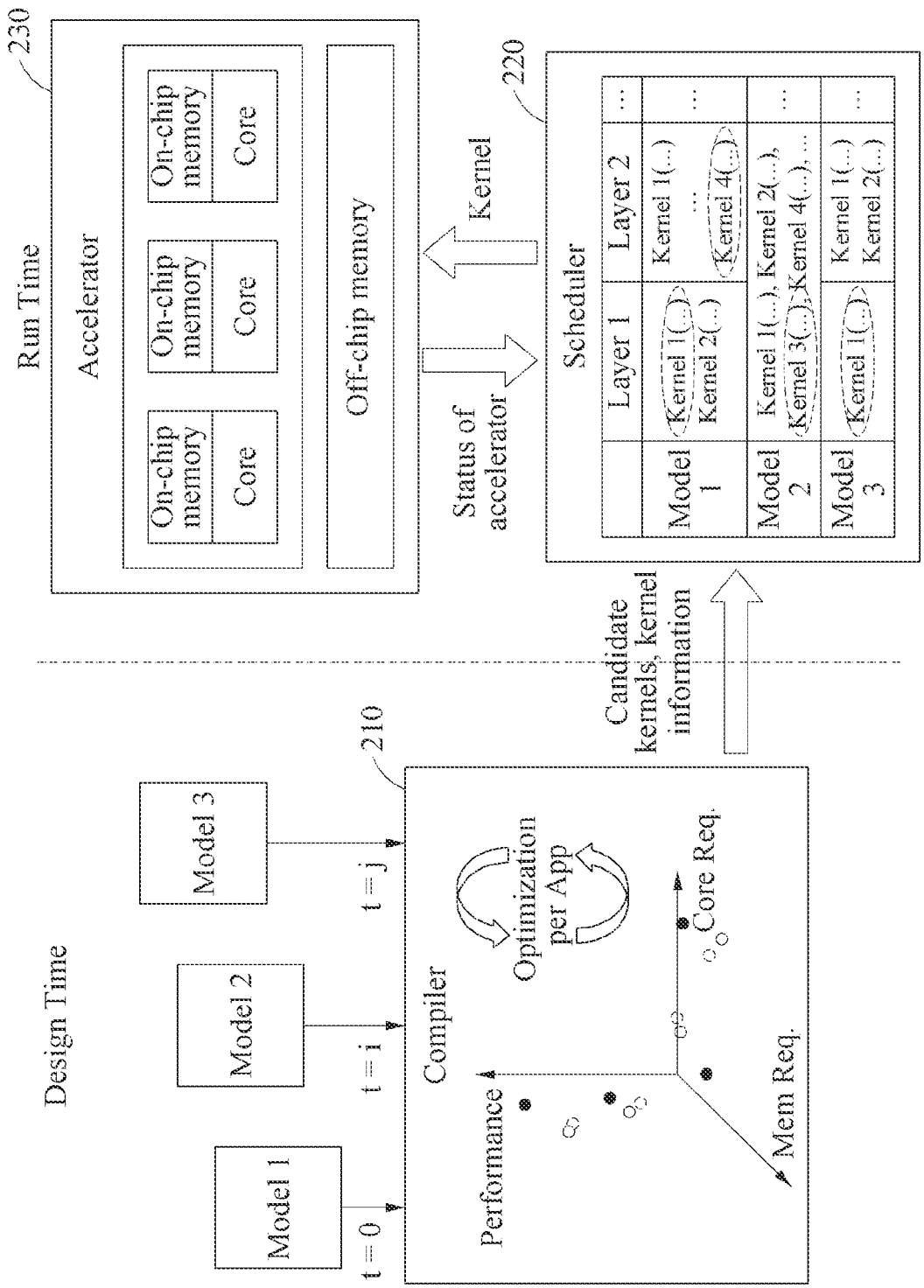
FIG. 2 illustrates an example of a resource allocation process for executing a multi-model on a multi-core accelerator.

FIG. 2 illustrates an example of a resource allocation process for executing a multi-model on a multi-core accelerator.

FIG. 2 illustrates an example in which a compiler 210 may generate a plurality of kernels in a design time and a scheduler 220 may allocate one of the plurality of kernels to an accelerator 230 based on a status of the accelerator 230 in a run time. In FIG. 2, it may be assumed that each of models 1 to 3 is requested at a specific time for clarity of description.

In the design time, in response to receiving a request for executing model 1, the compiler 210 may generate a plurality of candidate kernels runnable on the accelerator 230 for each of layers included in model 1. Various methods may be used to run a specific layer on the accelerator 230 and a kernel may vary accordingly. For example, a specific layer may be quickly processed using all of cores included in the accelerator 230 and may be slowly processed using only a single core included in the accelerator 230. Alternatively, an operational form of the accelerator 230 that runs the specific layer may vary based on a method of setting a data reuse pattern or a tiling factor to perform an operation according to the specific layer. Although the accelerator 230 may have various operational forms, the accelerator 230 may process the same layer. Therefore, output data of a corresponding layer may be determined to be the same.

The compiler 210 may generate a plurality of candidate kernels each in which any one or any combination of a number of cores, a data reuse pattern, and a tiling factor that are used when a corresponding layer runs on the accelerator 230 is different.

The plurality of candidate kernels may be generated based on a number of cores estimated to have a different run time among a number of cores available when running on the accelerator 230. For example, when ten cores are included in the accelerator 230, one to ten cores may be used to run a specific layer. Here, when an estimated run time significantly decreases according to an increase in the number of available cores from 1 to 6 and a change in the estimated run time is insignificant regardless of an increase in the number of cores from 7 to 10, the plurality of candidate kernels may be generated only for the number of cores from 1 to 6.

Also, the data reuse pattern used to generate the plurality of candidate kernels may include a pattern that reuses an input feature map (most), a pattern that reuses a weight (most), and a pattern that reuses an output feature map (most) when running on the accelerator 230. Here, the input feature map may be data input to a corresponding layer and the output feature map may be data output from the corresponding layer. Also, the tiling factor used to generate the plurality of candidate kernels may refer to a data processing unit determined based on the data reuse pattern and may be represented as, for example, a four-dimensional (4D) data size, such as a width, a height, a channel, and a tensor of a kernel.

The compiler 210 may generate kernel information about each of the candidate kernels. The kernel information may include resource use information about resources used when a corresponding candidate kernel runs on the accelerator 230. For example, the kernel information may include a number of cores, a data reuse pattern, a tiling factor, an estimated run time, a memory access pattern, and/or a memory use amount to run the corresponding candidate kernel.

Every time a request for executing a corresponding model is received, the compiler 210 may generate a plurality of candidate kernels for each of layers included in the corresponding model and corresponding kernel information and transfers the same to the scheduler 220. In one example, the compiler 210 may be implemented as, or included in, the aforementioned host processor 110.

In the run time, the scheduler 220 may select a single candidate kernel from among the plurality of candidate kernels based on corresponding kernel information and status information of the accelerator 230 and may allocate the selected candidate kernel to the accelerator 230. The scheduler 220 may select a single candidate kernel capable of maximizing a utilization rate of the accelerator 230 in a resource situation of the accelerator 230 from among a plurality of candidate kernels for a specific layer and may allocate the selected candidate kernel to a remaining resource of the accelerator 230. The status information of the accelerator 230 may be transferred from the accelerator 230 to the scheduler 220. The status information of the accelerator 230 may include, for example, any one or any combination of resource use information of the accelerator 230, kernel information of a layer running on the accelerator 230, and information about a subsequent layer of the layer running on the accelerator 230.

The scheduler 220 may allocate a resource (for example, a core, a memory, and/or a memory traffic bandwidth) required to run a kernel selected based on a resource situation of the accelerator 230 on the accelerator 230. When running of the kernel is completed, the scheduler 220 may continuously track a current available resource status of the accelerator 230 while retrieving the allocated resource.

Every time a layer running on the accelerator 230 is completed, the scheduler 220 may be called and perform scheduling. Also, the scheduler 220 may estimate in advance an amount of time used to run kernels on the accelerator 230 based on kernel information received in advance from the compiler 210. Therefore, the scheduler 220 may perform scheduling in advance without an additional model request. Here, although all of the scheduling may be performed in advance, rescheduling may be required when a new request is received. A scheduling point in time may be selected based on a resource status of hardware that executes the scheduler 220. For example, when resources of hardware are sufficient, overall throughput may be gained by performing all of the scheduling in advance. In contrast, when resources of hardware are insufficient or if restrictions exist, such as power requirements of hardware, are present (for example, when it is important to reduce power consumption), scheduling may be performed every time running of each layer is completed. As another example, when execution of a new model is requested while executing a model and the corresponding new model is executable using a remaining resource of the accelerator 230, the scheduler 220 may be called to perform scheduling. Here, whether the new model is executable using the remaining resource of the accelerator 230 may be determined based on whether all of or a portion of layers of the new model are runnable using the remaining resource. In addition, various determination criteria may apply without limitation.

In one example, the scheduler 220 may be implemented as, or included in, the aforementioned host processor 110 or may be implemented as, or included in, a top core in the accelerator 230 when a multi-level core is included in the accelerator 230. A hardware device that implements the compiler 210 and/or the scheduler 220 may be referred to as a data processing apparatus herein.

FIG. 3 illustrates an example of kernel information.

FIG. 3 illustrates an example of kernel information generated by a compiler (for example, the compiler 210). Kernel information about each of candidate kernels may include a number of cores, a data reuse pattern, a tiling factor, an estimated run time, a memory access pattern, and a memory use amount to run a corresponding candidate kernel. Kernel information of FIG. 3 includes "(number of cores, data reuse pattern, tiling factor)". In FIG. 3, IF represents a pattern that reuses an input feature map, W represents a pattern that reuses a weight, and OF represents a pattern that reuses an output feature map. In FIG. 3, a tiling factor (for example, "(8, 1, 2, 2)") may correspond to a 4D data size, such as a width, a height, a channel, and a tensor of a kernel. In model 2, layer 1 and layer 2 may run through a single kernel in a fused form and a plurality of kernels may be generated for layer 1 and layer 2 and kernel information corresponding thereto may be determined.

Figure 4:
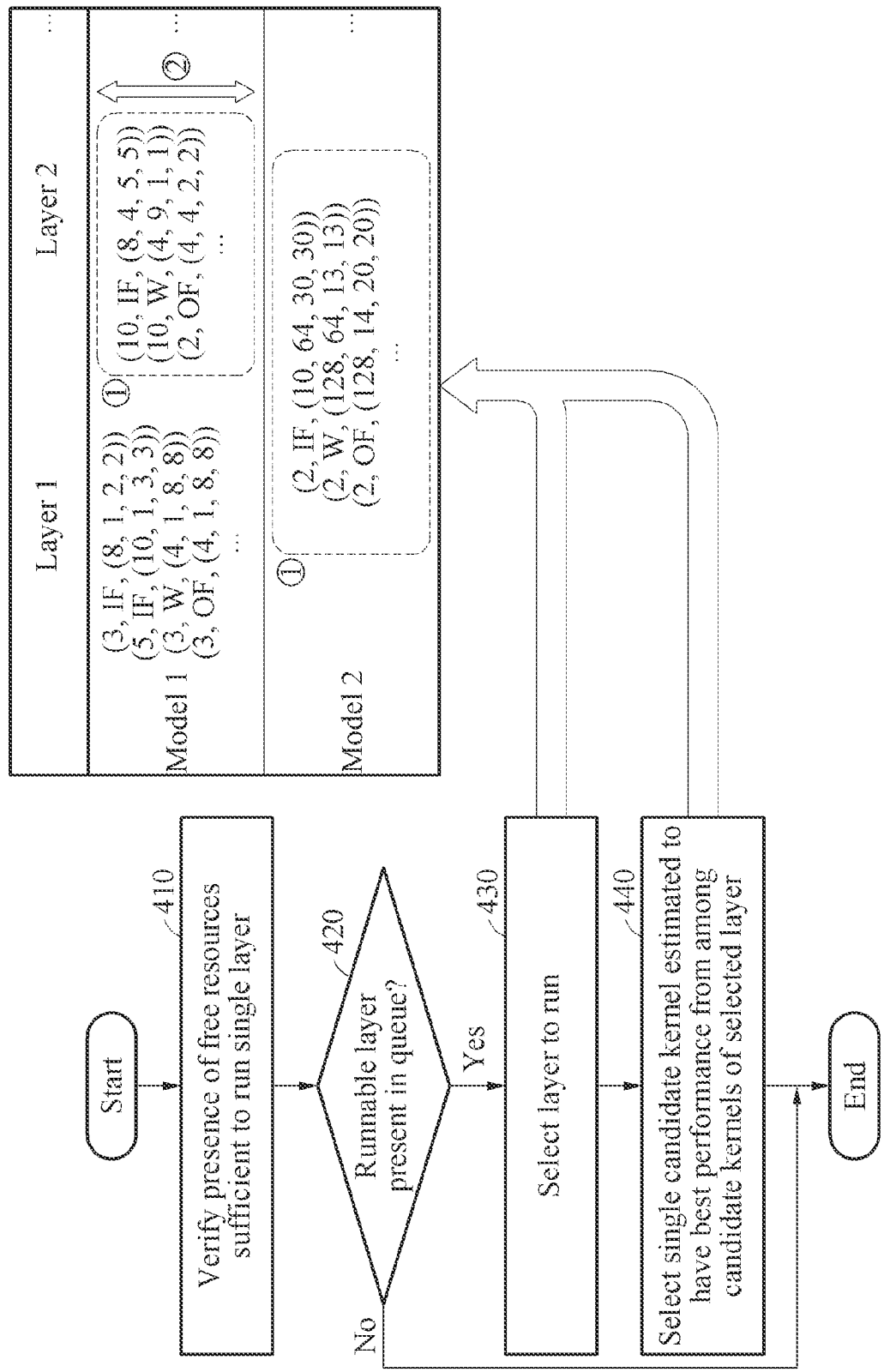
FIGS. 4 to 6 illustrate examples of a process of selecting a single candidate kernel from among a plurality of candidate kernels.
Figure 5:
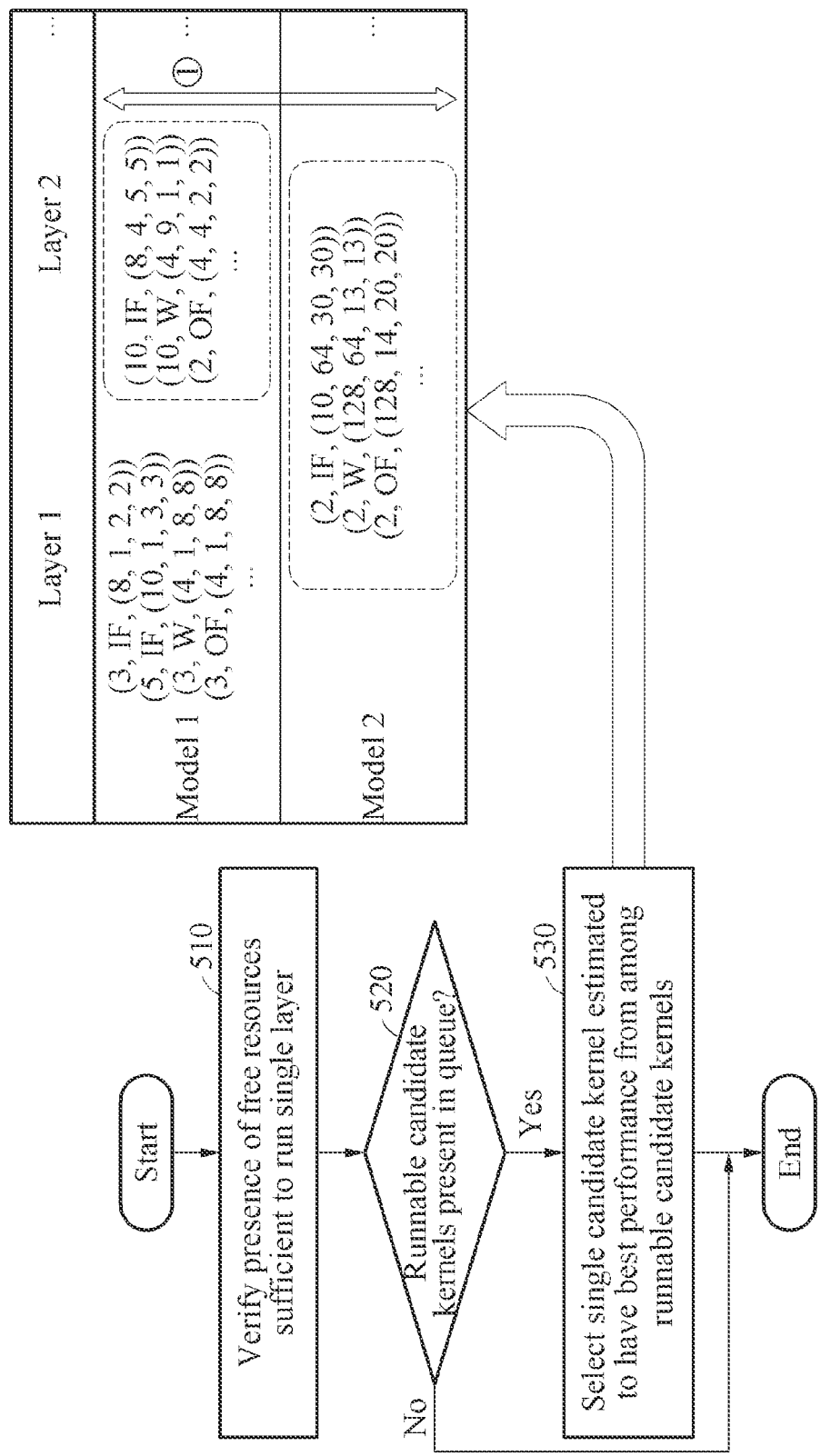
Figure 6:
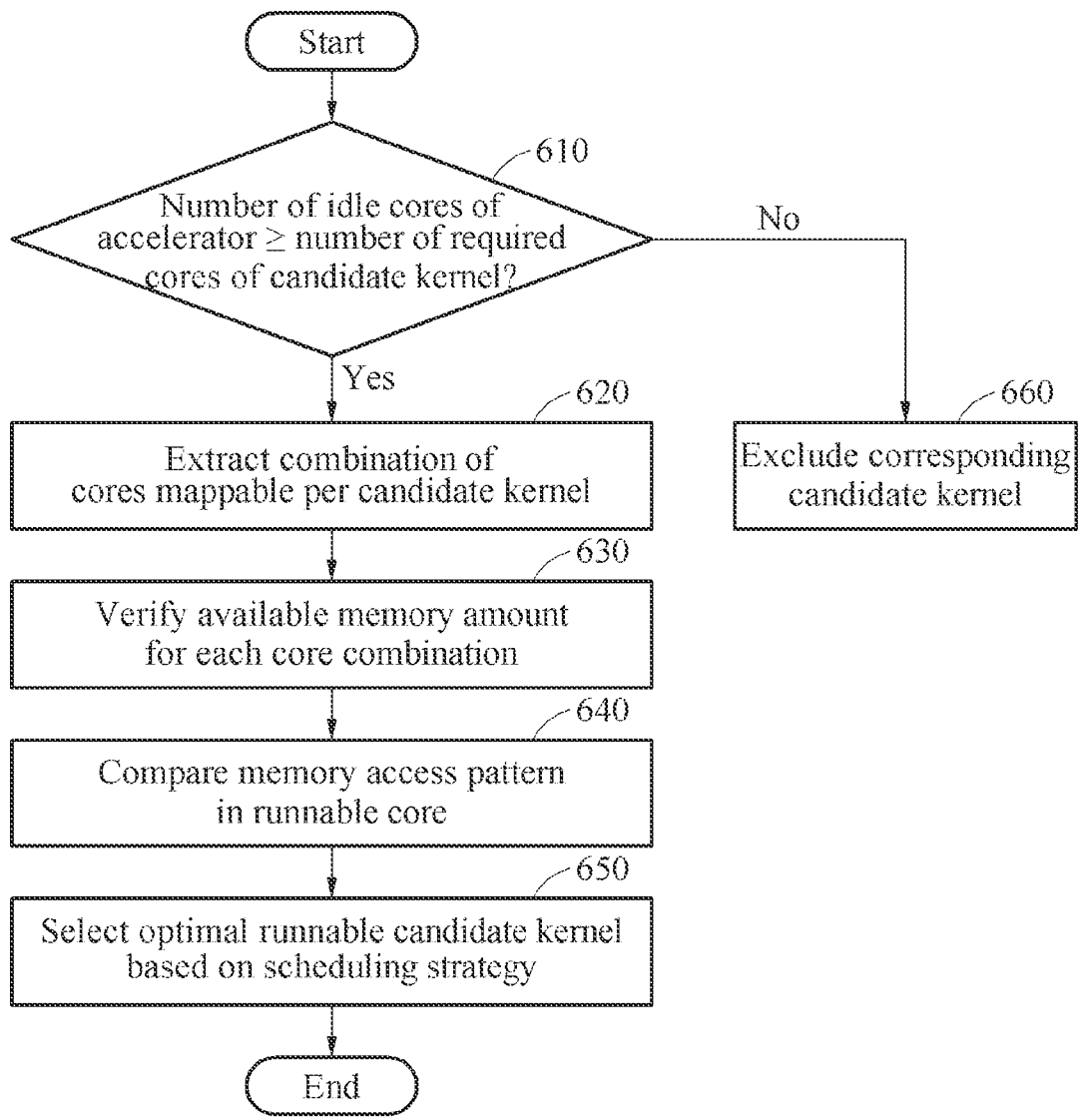

FIGS. 4 to 6 illustrate examples of a process of selecting a single candidate kernel from among a plurality of candidate kernels.

FIG. 4 is a flowchart illustrating an example in which a scheduler (for example, the scheduler 220) initially selects a layer to run on an accelerator and then selects a single candidate kernel from among a plurality of candidate kernels corresponding to the selected layer.

Referring to FIG. 4, in operation 410, the scheduler may verify a presence of free resources sufficient to run a single layer (that is, whether resources sufficient to run a single kernel on an accelerator are secured may be determined, for example).

In operation 420, the scheduler may verify whether a runnable layer is present in a queue. A layer to run may be included in the queue. When the runnable layer is present in the queue, operation 430 may be performed. When the runnable layer is absent in the queue, the operation of the scheduler may be terminated.

In operation 430, the scheduler may select a layer to run from among runnable layers stored in the queue. For example, when a plurality of models has different priority, a layer belonging to a top priority model may be selected. However, it is provided as an example only. Referring to an example illustrated on the right of FIG. 4, runnable layers include layer 2 of model 1 and fused layer 1, 2 of model 2. One of them may be selected as a layer to run on the accelerator.

In operation 440, the scheduler may select a single candidate kernel estimated to have the best performance from among a plurality of candidate kernels for the selected layer. The scheduler may select a candidate kernel estimated to have the best accelerator performance when running each candidate kernel based on a current situation of the accelerator and kernel information of candidate kernels. A criterion of performance may include any one or any combination of a throughput of each model, a latency, a fairness, a power consumption amount, and a utilization rate of the accelerator based on a situation or a selection of a user. In the example illustrated on the right of FIG. 4, a single candidate kernel may be selected from among the plurality of candidate kernels for layer 2 of selected model 1.

For example, a candidate kernel estimated to have the best performance may be selected based on any one of a greedy scheme, an equal resource distribution scheme, an overall system performance prioritization scheme, and a power consumption minimization scheme.

The greedy scheme may refer to a scheme of selecting a kernel estimated to have a shortest run time from among runnable candidate kernels within remaining resources of the accelerator. Here, a remaining resource may indicate only a current idle resource that is not actually used and may indicate a resource that is currently used in another running kernel, but estimated to be a remaining resource. For example, the greedy scheme may repeatedly perform a process of selecting a single candidate kernel estimated to have the shortest run time from among the plurality of candidate kernels for one or more layers to subsequently run.

The equal resource distribution scheme may refer to a scheme of dividing the entire free resources of the accelerator by a number of concurrently runnable layers, equally distributing resources to each layer, and selecting a kernel estimated to have a relatively shortest run time from among runnable candidate kernels for a specific layer within the distributed resource. For example, if a total number of cores in the accelerator is 20 and four models are to run (that is, be executed), five cores may be allocated to each model and a single candidate kernel estimated to have the shortest run time based on the allocated five cores may be selected from among a plurality of candidate kernels for a layer to run on each model.

The overall system performance prioritization scheme may refer to a scheme of selecting a combination of kernels estimated to have the shortest relative run time average, for example, geometric average when selecting candidate kernels of currently runnable layers one by one. For example, dissimilar to the greedy scheme of selecting a kernel estimated to have the shortest run time, the overall system performance prioritization scheme may be a scheduling scheme of finding a combination of kernels to use a shortest time from running to completion in the overall perspective.

The power consumption minimization scheme may refer to a scheme of selecting a kernel using a smallest resource from among candidate kernels that meet a required or determined quality of service (QoS). For example, the power consumption minimization scheme may select a kernel that requires a smallest resource from among kernels meeting a preset QoS rather than a kernel estimated to have the shortest run time.

Through this, in a run time, the scheduler of one or more embodiments may minimize contention between models and may maximize a resource utilization rate of the accelerator by adaptively changing a number of cores used to run each layer based on a resource situation of the accelerator. For example, scheduling may be performed to quickly complete a specific model by increasing the overall system throughput through the overall system performance prioritization scheme in a general situation in which specific requirements are absent, and by selectively applying the greedy scheme to the specific model in response to an urgent request for executing the specific model.

FIG. 5 is a flowchart illustrating an example of a process in which a scheduler (for example, the scheduler 220) selects a kernel to run on an accelerator from among all of runnable candidate kernels instead of initially selecting a layer to run.

Referring to FIG. 5, in operation 510, the scheduler may verify a presence of free resources sufficient to run a single layer. In operation 520, the scheduler may verify whether runnable candidate kernels are present in the queue. Candidate kernels to run may be included in the queue. When the runnable candidate kernels are present in the queue, operation 530 may be performed. When the runnable candidate kernels are absent in the queue, the operation of the scheduler may be terminated. In operation 530, the scheduler may select a single candidate kernel estimated to have the best performance from among the runnable candidate kernels. Referring to the example illustrated on the right of FIG. 5, a single candidate kernel may be selected from among a plurality of candidate kernels for layer 2 of model 1 and a plurality of candidate kernels for fused layer 1, 2 of model 2. If priority is absent between a plurality of models, a candidate kernel estimated to have the best performance may be selected. The aforementioned description of selecting the candidate kernel (with respect to operation 440 of FIG. 4, for example) may apply to an example operation 530 of FIG. 5 and further description is omitted.

FIG. 6 is a flowchart illustrating an example of a process in which a scheduler (for example, the scheduler 220) performs a kernel selection based on a memory access pattern.

Referring to FIG. 6, in operation 610, the scheduler may determine whether a number of idle cores of an accelerator is greater than or equal to a number of required cores of a candidate kernel. When it is determined that the number of idle cores of the accelerator is less than the number of required cores of the candidate kernel in operation 610, the scheduler may exclude the corresponding candidate kernel in operation 660.

When it is determined that the number of idle cores of the accelerator is greater than or equal to the number of required cores of the candidate kernel in operation 610, in operation 620, the scheduler may extract a combination of cores mappable per candidate kernel. Although a single kernel may be executed by the same number of cores, a memory access scheme may vary based on a structure of the accelerator. When the accelerator includes a hierarchical core and memory, a combination about a number of cores to be used for each cluster may be extracted.

For example, when five cores constitute a single cluster and the accelerator includes four clusters, a total of 20 cores may be used. Here, when ten cores included in two clusters are being used and two cores are being used in another cluster, three cores and five cores among remaining eight idle cores may be verified to be included in two clusters, respectively.

In operation 630, the scheduler may verify an available memory amount for each core combination extracted in operation 620. The scheduler may verify a memory amount that may be used by an idle core of each cluster.

In operation 640, the scheduler may compare a memory access pattern in a runnable core. The scheduler may verify a memory access pattern for each candidate kernel based on a tiling factor and a data reuse pattern. A comparison regarding whether a collision occurs between the memory access pattern of the candidate kernel and a memory access pattern of a model currently running on the accelerator may be performed. If the collision occurs, a degree of effect for QoS of the running model and QoS of the model to run may be analyzed.

In operation 650, the scheduler may select an optimal runnable candidate kernel based on a scheduling strategy. For example, when a collision is determined not to occur between the memory access pattern of the candidate kernel and the memory access pattern of the currently running model in operation 640, the candidate kernel may be selected in operation 650. On the contrary, when a collision is determined to occur between the memory access pattern of the candidate kernel and the memory access pattern of the currently running model in operation 640, a candidate kernel having a least collision may be selected in operation 650.

In one example, in the case of executing a plurality of models, the plurality of models may share a bus corresponding to a shared resource and thus, a memory access pattern may be considered. The memory access pattern may be verified for each of an input feature map, a weight, and an output feature map. A memory access thereof may be performed at desired intervals. The memory access pattern thereof may be converted to a real-time task (for example, a period and an access time) to determine a demand bound function used in a real-time task research. Using the demand bound function, the effect of different memory access patterns may be verified. Through this, whether a memory access of another model has a malicious effect on QoS that is one of the requirements of the user may be verified in advance and the memory access may be prevented accordingly.

Figure 7:
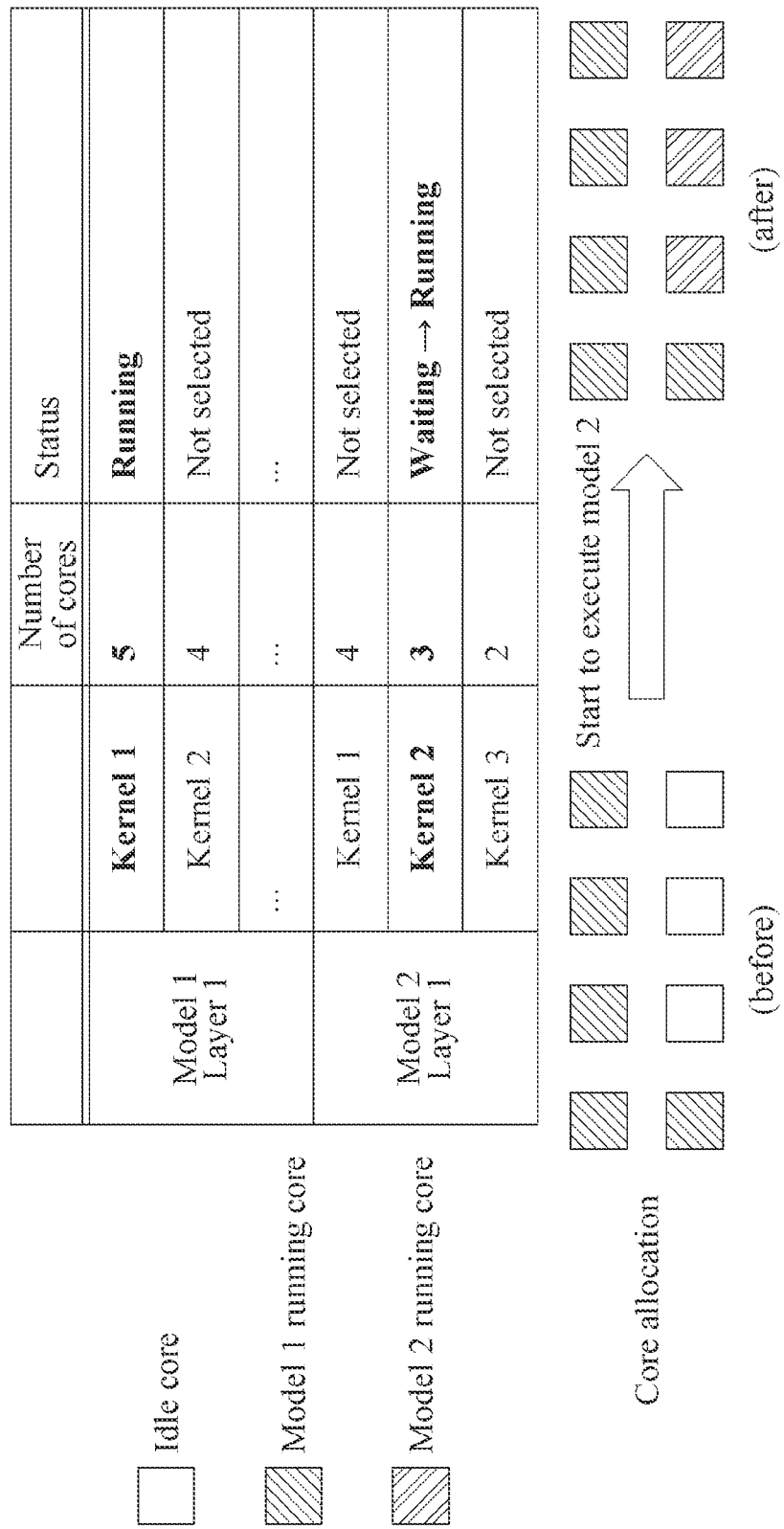
FIGS. 7 and 8 illustrate examples of a resource allocation.
Figure 8:
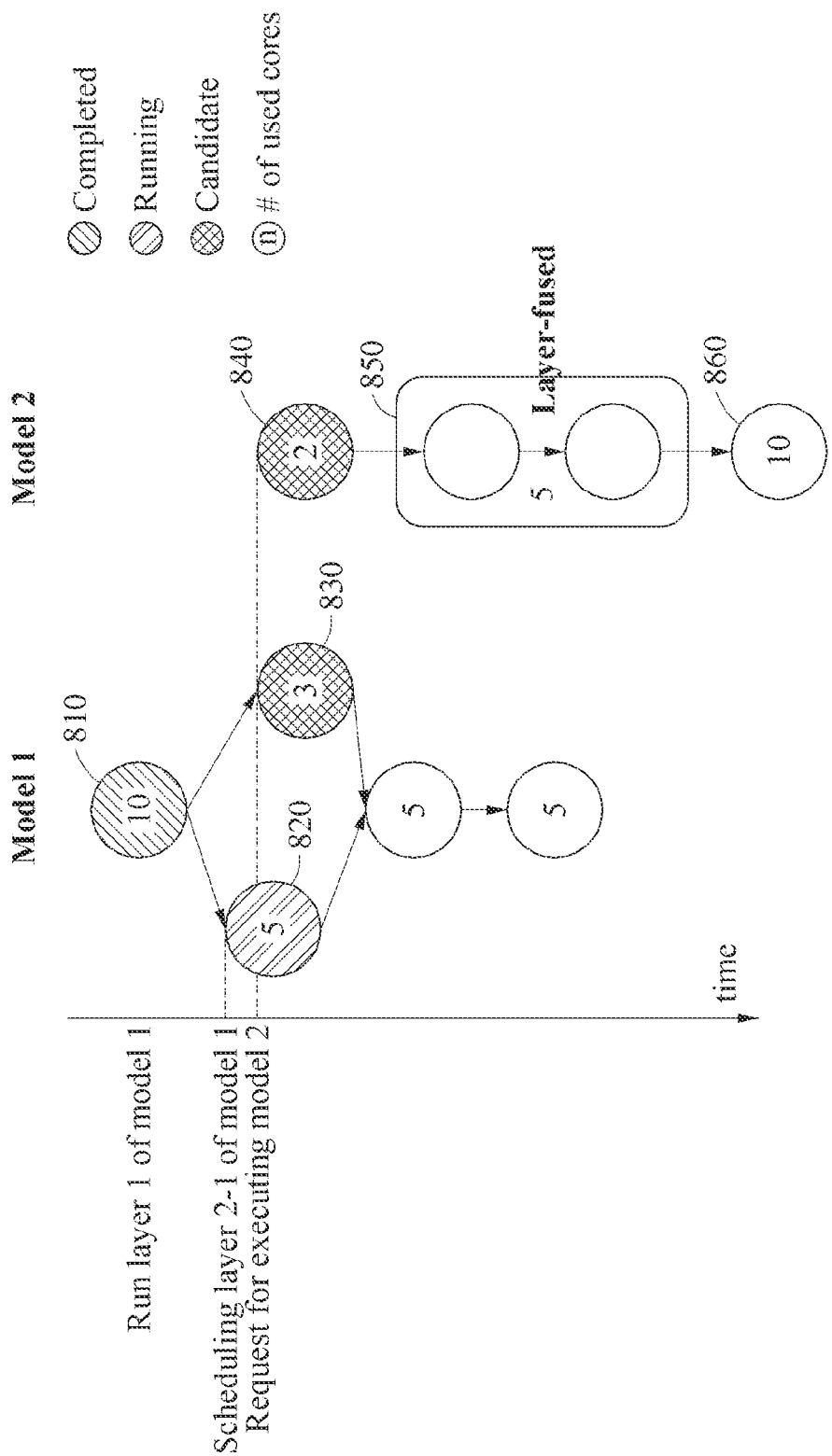

FIGS. 7 and 8 illustrate examples of a resource allocation.

FIG. 7 illustrates an example of dynamically allocating resources. A table illustrated in an upper portion of FIG. 7 shows a list of runnable candidate kernels for each layer and a core allocation portion illustrated in a lower portion of FIG. 7 shows a method of allocating eight cores to calculate each layer.

In a "before" situation (before layer 1 of model 1 starts to run, for example) executed only in model 1, five of the eight cores are allocated to run layer 1 of model 1 and the remaining three of the eight cores are in an idle status. In an "after" situation in which layer 1 of model 1 starts to run in the above situation, layer 1 of model 2 may run by selecting kernel 2 capable of maximally using the remaining three cores. As described above, a utilization rate of the accelerator may be effectively improved by adaptively allocating resources in a current status of the accelerator.

FIG. 8 illustrates another example of dynamically allocating resources. In the example of FIG. 8, it is assumed that execution of model 2 is requested in a situation in which execution of model 1 is initially requested and runs on the accelerator.

When only model 1 is executed on the accelerator, all of ten cores included in the accelerator are allocated to layer 1 of model 1 (810). Five cores out of the ten cores are initially allocated to layer 2-1 to run each of layer 2-1 and layer 2-2 to which output data of layer 1 is transferred in model 1 (820). When execution of model 2 is requested before starting to run layer 2-2, a portion of the remaining five cores, for example, three cores, are allocated to layer 2-2 of model 1 (830) and the remaining two cores are allocated to layer 1 of model 2 (840). To run layer 3 to which output data of layer 2-1 and layer 2-2 of model 1 is transferred, five cores are allocated and remaining five cores are allocated to model 2. Here, layers 2 and 3 of model 2 are fused in a compiling stage and operate as a single fused layer and the remaining five cores are allocated to the fused layer (850). After execution of model 1 is completed, all of the ten cores are allocated to model 2 (860). Here, migration cost may be minimized by maintaining allocation locations of cores allocated to each model to the maximum unless execution of a separate new model is requested.

As described above, even in a run time in which a deep learning model is executed, the methods of one or more embodiments may minimize an idle time of the accelerator and improve a utilization rate of the accelerator by adaptively changing a resource allocation based on a status of the accelerator and by selecting a candidate kernel corresponding to an appropriate resource allocation, such as an optimal number of cores when running each layer.

Figure 9:
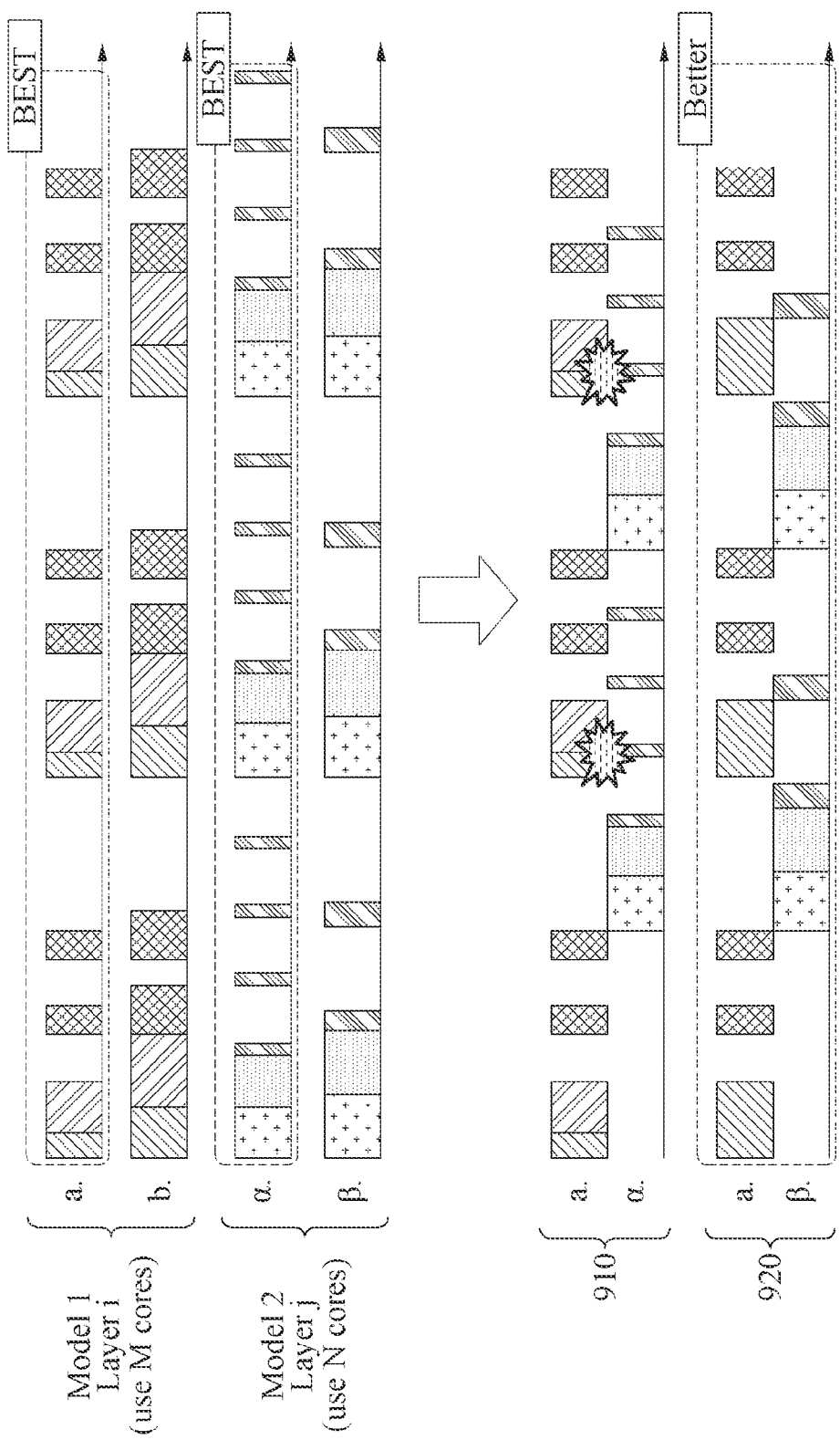
FIG. 9 illustrates an example of a resource allocation based on a memory access pattern.

FIG. 9 illustrates an example of a resource allocation based on a memory access pattern.

FIG. 9 illustrates an example of allocating a resource based on presence or absence of a collision between memory access patterns of concurrently running models. Each of layer i of model 1 and layer j of model 2 may have various memory access patterns and, here, a and α may be determined as most efficient memory access patterns, respectively. Each of the memory access patterns a and α may represent a most efficient pattern when independently running a corresponding model. Depending on examples, in the case of concurrently running layer i of model 1 and layer j of model 2 based on the memory access patterns a and α, respectively, a collision may occur between the memory access patterns (910). That is, due to overlapping of patterns that use a memory access resource between models 1 and 2, a collision may occur, which may cause one model to not use the memory access resource. Since the collision has a malicious effect on the utilization of the accelerator, the example of one or more embodiments may minimize the collision. Therefore, the example of one or more embodiments may consider whether a collision is present between memory access patterns of models concurrently running when allocating a resource of the accelerator. In the example of FIG. 9, when it is determined that the collision occurs between memory access patterns a and α, memory access pattern a of layer 1 of model 1 and memory access pattern β of layer j of model 2 that does not collide with model 1 may be selected. A candidate kernel corresponding to the memory access pattern a may be selected to run layer i of model 1, and a candidate kernel corresponding to the memory access pattern β may be selected to run layer j of model 2. Thus, a kernel that less affects a memory access when executing a plurality of models may be selected.

Figure 10:
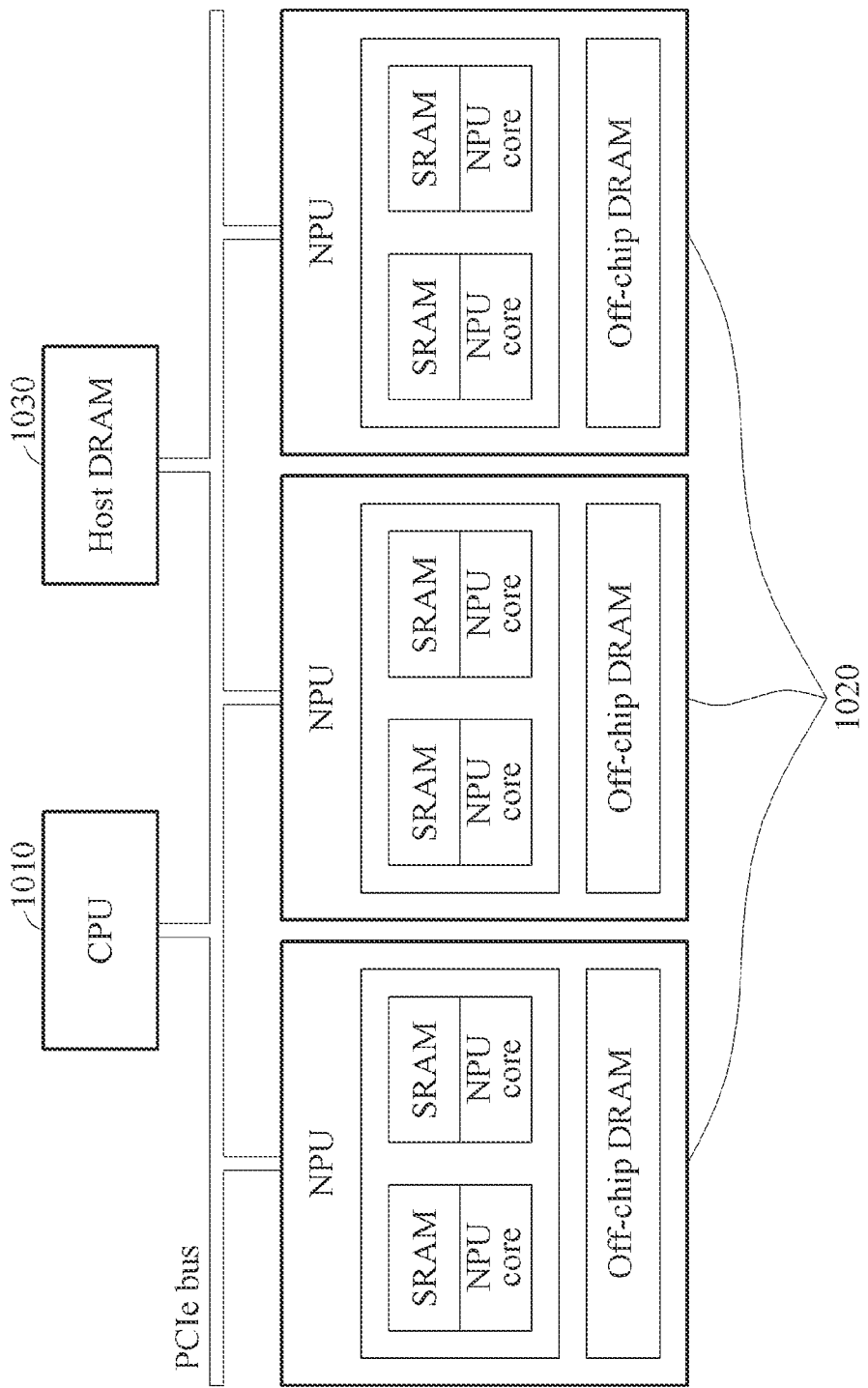
FIG. 10 illustrates an example of an electronic device including a plurality of accelerators.

FIG. 10 illustrates an example of an electronic device that includes a plurality of accelerators.

Referring to FIG. 10, the electronic device may include a CPU 1010, a plurality of NPUs 1020, and a host DRAM 1030. Here, the CPU 1010 may correspond to, or be included in, the aforementioned host processor 110 and the NPUs 1020 may correspond to, or be included in, the aforementioned accelerator 120.

In addition to the kernel information of aforementioned examples, when at least one model is executed on the plurality of NPUs 1020, kernel information generated by a compiler may further include resource information additionally consumed to use the plurality of NPUs 1020. Also, a scheduler may perform scheduling based on contention between kernels to run on the plurality of NPUs 1020 and a performance difference according to a change in a system structure.

In the electronic device of FIG. 10, a model may be executed through at least two NPUs 1020. In this case, the NPUs 1020 may exchange data through a peripheral component interconnect express (PCIe) bus. Also, when capacity of an on-chip memory, for example, an SRAM, or an off-chip memory in the NPU 1020 is insufficient, the host DRAM 1030 may be additionally used.

With respect to a candidate kernel generated to use a plurality of NPUs 1020 among candidate kernels generated by the compiler, information about a data transmission amount between the NPUs 1020 may be added to corresponding kernel information. With respect to a candidate kernel generated to use the host DRAM 1030, information about a host memory use amount may be added to corresponding kernel information.

Based on such kernel information, the scheduler may select a kernel suitable for an accelerator situation in a run time. For example, in the case of a layer that requires a great operation time, distributedly processing corresponding operations over a plurality of NPUs 1020 may be beneficial (or result in a faster run time) rather than processing the operations using a single NPU 1020, even when accounting for migration cost of data between the NPUs 1020. Therefore, in this case, a kernel that uses the plurality of NPUs 1020 may be selected.

Figure 11:
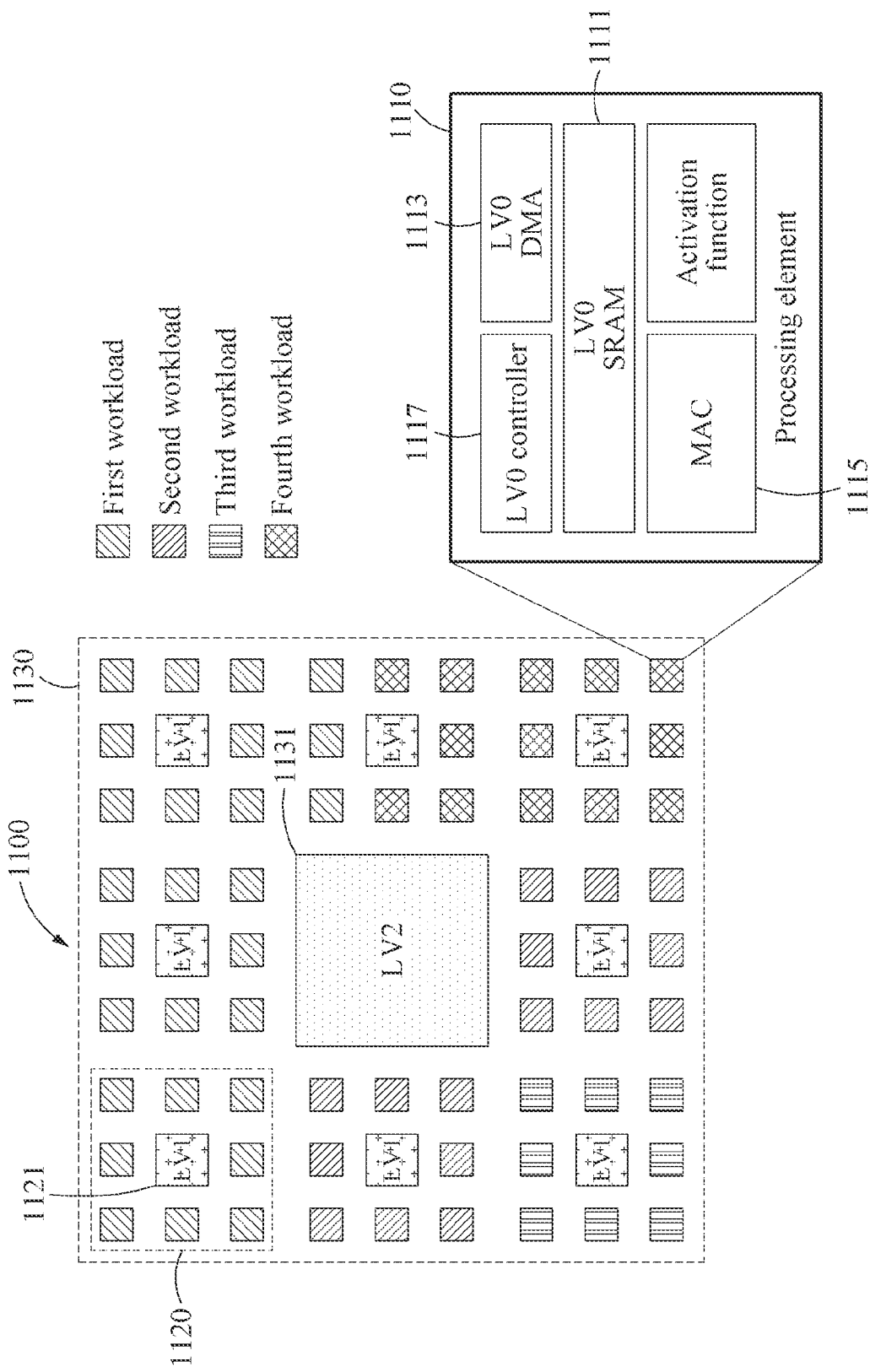
FIG. 11 illustrates an example of a hierarchical structure of an accelerator.

FIG. 11 illustrates an example of a hierarchical structure of an accelerator.

FIG. 11 illustrates an example of an accelerator 1100 in a hierarchical structure. Referring to FIG. 11, the accelerator 1100 may include a plurality of processing elements (PEs) and a multi-level memory accessible by at least one of the plurality of processing elements. The multi-level memory may be a collective expression for a level 0 (LV0) memory 1111, a level 1 (LV1) memory 1121, and a level 2 (LV2) memory 1131 corresponding to an on-chip memory of the accelerator 1100.

One of the plurality of processing elements, a processing element 1110 may include the LV0 memory 1111, an LV0 direct memory access (DMA) 1113, a multiplier-accumulator (MAC) 1115, and an LV0 controller 1117.

The LV0 memory 1111 may be a memory accessible by the corresponding processing element 1110. The LV0 DMA 1113 may control input data and/or output data of the LV0 memory 1111 in response to an instruction of the LV0 controller 1117.

The MAC 1115 may perform an operation of a workload allocated to the processing element 1110. Also, the MAC 1115 may perform a multiply-accumulation operation on given data or apply an activation function on the given data. For example, the activation function may include sigmoid, hyperbolic tangent (tanh), and a rectified linear unit (ReLU).

The LV0 controller 1117 may be a device configured to control components included in the processing element 1110. For example, the LV0 controller 1117 may control the LV0 memory 1111, the LV0 DMA 1113, and the MAC 1115.

The aforementioned description related to the processing element 1110 may apply as is to each of the plurality of processing elements included in the accelerator 1100.

In one example, the plurality of processing elements may be clustered by n processing elements. Here, n denotes a natural number greater than 1 and less than the number of processing elements included in the accelerator 1100. A portion of the plurality of processing elements included in the accelerator 1100 may be clustered, which is described based on the clustered processing elements 1120.

The clustered processing elements 1120 may share a single LV1 memory 1121. The LV1 memory 1121 may be accessible by the clustered processing elements 1120. For example, although operations respectively performed in a first processing element and a second processing element in the clustered processing elements 1120 may differ from each other, a portion of data used for the corresponding operations may be common. By storing the common data in the LV1 memory 1121 to be shared between the first processing element and the second processing element instead of sharing the common data in the LV0 memory 1111 of each of the first processing element and the second processing element, the efficiency of the accelerator 1100 may be improved. In the example of FIG. 11, each of the processing elements adjacent to the LV1 memory 1121 may access the LV1 memory 1121.

Also, an entirety 1130 of the plurality of processing elements may share the LV2 memory 1131. The LV2 memory 1131 may be accessible by the plurality of processing elements included in the accelerator 1100. For example, processing elements that are not clustered, but have common partial data required for an operation to be performed may be included among the plurality of processing elements included in the accelerator 1100. Such processing elements may not share corresponding data through the LV1 memory 1121, but may efficiently share the common data through the LV2 memory 1131, thereby improving the efficiency of the accelerator 1100.

Each of the processing elements may respectively include and access the LV0 memory 1111, the LV1 memory 1121 adjacent thereto, and the LV2 memory 1131 of the accelerator 1100, and may use such memories when performing an allocated workload. The accelerator 1100 may include the multi-level memory and include memories in a hierarchical structure. Also, a DMA and a controller included in the accelerator 1100 may have a hierarchical multi-level.

In the example of FIG. 11, the plurality of processing elements included in the accelerator 1100 may concurrently perform four workloads (for example, a first workload, a second workload, a third workload, and a fourth workload). For example, a workload that uses a relatively large computational amount may be allocated to a relatively large number of processing elements and processed thereby, and a workload that uses a relatively small computational amount may be allocated to a relatively small number of processing elements and processed thereby.

Although FIG. 11 illustrates that 64 processing elements are clustered by 8 and three level memories are used to perform four workloads, it is provided as an example only for clarity of description. Various numbers of processing elements, workloads, and levels may apply without limitation.

Figure 12:
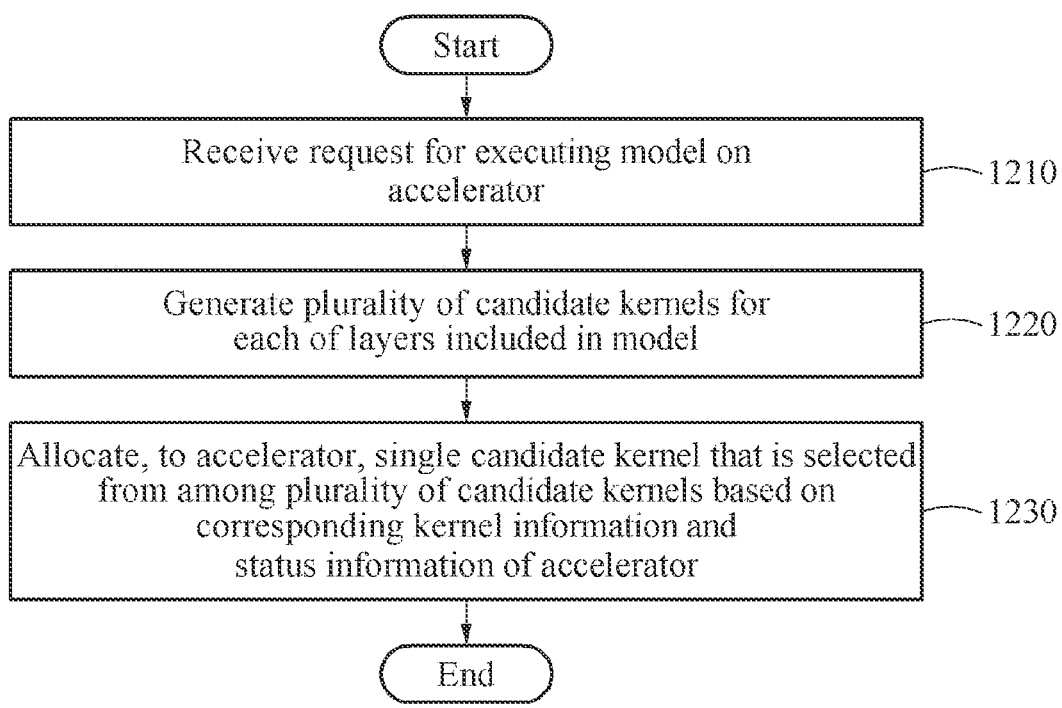
FIG. 12 illustrates an example of a data processing method.

FIG. 12 illustrates an example of a data processing method.

Referring to FIG. 12, the data processing method performed by at least one processor includes operation 1210 of receiving a request for executing a model on an accelerator, operation 1220 of generating a plurality of candidate kernels for each of layers included in the model, and operation 1230 of allocating, to the accelerator, a single candidate kernel that is selected from among a plurality of candidate kernels for a layer to run on the accelerator based on corresponding kernel information and status information of the accelerator.

The examples described herein may comprehensively apply to a server-oriented product line applied with at least one system on a chip (SoC) each in which a plurality of accelerator cores and shared memories in a hierarchical structure are connected in a cluster-based structure, for accelerating AI processing.

The description made above with reference to FIGS. 1 to 11 may apply as is to each of operations 1210 to 1230 of FIG. 12 and further description is omitted.

Figure 13:
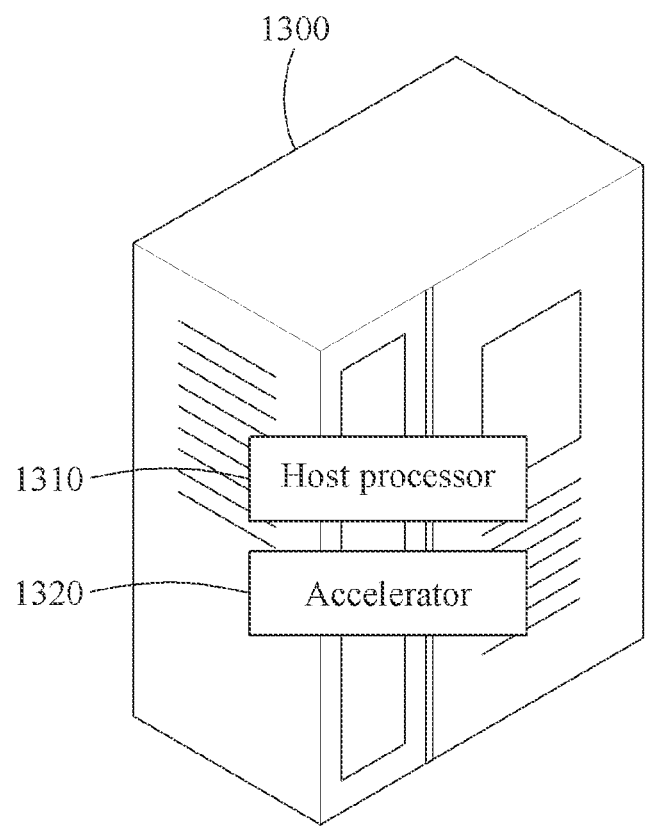
FIGS. 13 and 14 illustrate examples of an electronic device.
Figure 14:
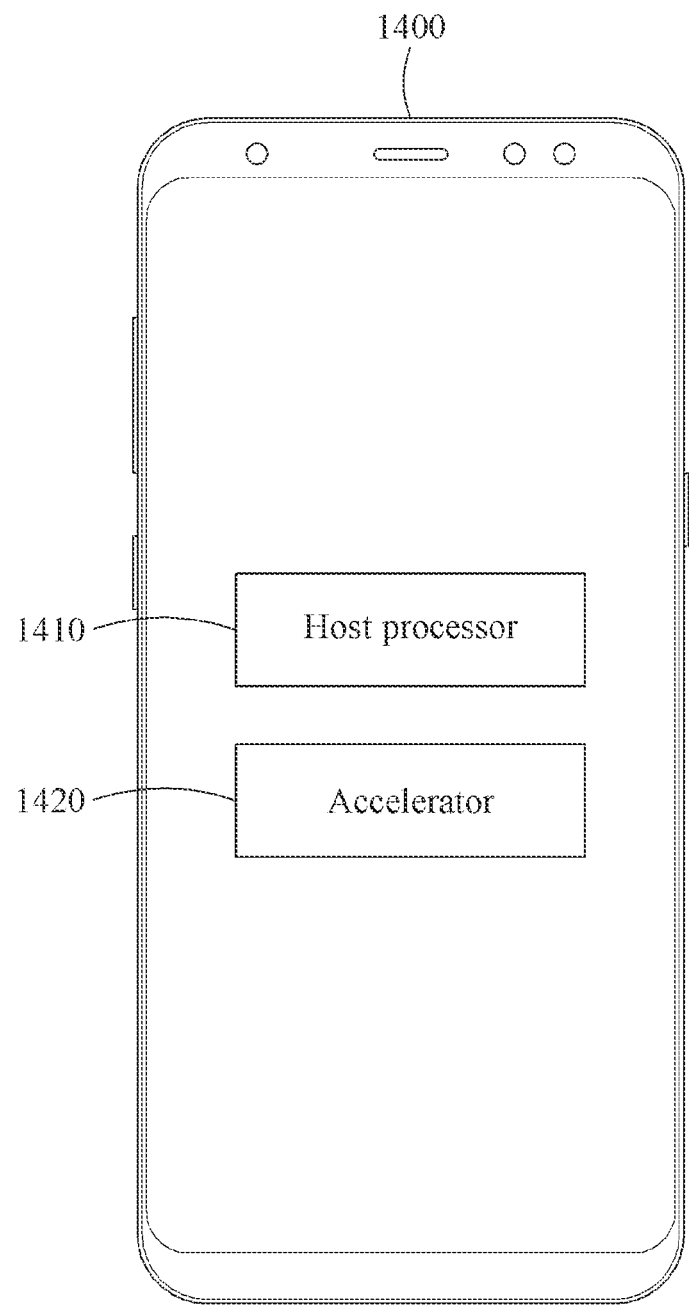

FIGS. 13 and 14 illustrate examples of an electronic device.

Referring to FIG. 13, the electronic device may be a server 1300.

The server 1300 may be a separate device distinguished from a user terminal controlled by a user and may communicate with at least one user terminal through a wired and/or wireless network. The server 1300 may receive requests that are concurrently transmitted from a plurality of users using their own terminals. A host processor 1310 included in the server 1300 may generate a plurality of candidate kernels for each of layers included in a requested model. An accelerator 1320 may run a layer desired to run based on a single candidate kernel that is selected from among a plurality of candidate kernels for the layer based on corresponding kernel information and status information of the accelerator 1320. Each of inference results acquired by executing the model on the accelerator 1320 may return to each corresponding user terminal. Examples of the user terminal may include various computing devices such as a smartphone, a tablet, a laptop, and a personal computer, various wearable devices such as a smart watch and a smart glass, various home appliances such as a smart speaker, a smart TV, and a smart refrigerator, a smart vehicle, a smart kiosk, an Internet of things (IoT) device, a drone, and/or a robot.

Referring to FIG. 14, the electronic device may be a user terminal 1400. Although FIG. 14 illustrates the user terminal 1400 as a smartphone for clarity of description, it is provided as an example only. Any user controllable devices may apply without limitation. The user terminal 1400 may acquire a request directly from a user, a host processor 1410 included in the user terminal 1400 may generate a plurality of candidate kernels for each of layers included in a requested model, and an accelerator 1420 may run a layer desired to run based on a single candidate kernel that is selected from among a plurality of candidate kernels for the layer based on corresponding kernel information and status information of the accelerator 1420. Inference results acquired through the above running process may be provided to the user or a subsequent operation of the user terminal 1400 may be performed based on the inference results.

The server 1300 and the user terminal 1400 implemented as the electronic devices of FIGS. 13 and 14, respectively, may process the aforementioned operations of FIGS. 1-12.

Therefore, further description is omitted. Also, the electronic device used herein may be represented herein as an accelerator system that includes a host processor and an accelerator.

The electronic devices, host processors, accelerators, accelerator chips, accelerator cores, on-chip memories, off-chip memories, compilers, schedulers, CPUs, NPUs, host DRAMs, clustered processing elements, LV1 memories, processing elements, LV0 memories, LV0 DMAs, MACs, LV0 controllers, servers, user terminals, electronic device 100, host processor 110, accelerator 120, accelerator chip 130, accelerator core 131, on-chip memory 132, off-chip memory 140, compiler 210, scheduler 220, accelerator 230, CPU 1010, NPUs 1020, host DRAM 1030, accelerator 1100, clustered processing elements 1120, LV1 memory 1121, processing element 1110, LV0 memory 1111, LV0 DMA 1113, MAC 1115, LV0 controller 1117, server 1300, host processor 1310, accelerator 1320, user terminal 1400, host processor 1410, accelerator 1420, apparatuses, units, modules, devices, and other components described herein with respect to FIGS. 1-14 are implemented by or representative of hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-14 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A processor-implemented data processing method, the method comprising:
   receiving a request for executing a neural network model on an accelerator;
   in response to receiving the request, generating a plurality of candidate kernels for each layer of a plurality of layers comprised in the neural network model;
   executing the neural network model by allocating, to the accelerator, a single candidate kernel that is selected from among the plurality of candidate kernels for a layer to run on the accelerator based on corresponding kernel information and status information of the accelerator, including:
      selecting the single candidate kernel from among the plurality of candidate kernels based on a required number of cores included in the corresponding kernel information and remaining number of available cores of the accelerator, wherein the required number of cores of the selected single candidate kernel is less than or equal to the remaining number of available cores of the accelerator and
      allocating the selected single candidate kernel to the remaining number of available cores of the accelerator during a run-time; and
   performing an inference operation associated with the request based on the executing the neural network model on the accelerator using the remaining number of available cores of the accelerator.

2. The method of claim 1, wherein the generating comprises generating the plurality of candidate kernels to run each layer using a different accelerator resource use amount.

3. The method of claim 1, wherein the generating comprises generating the plurality of candidate kernels such that, for each candidate kernel of the plurality of candidate kernels, any one or any combination of a number of cores, a data reuse pattern, and a tiling factor used when a corresponding layer of one of the plurality of candidate kernels runs on the accelerator is different than that used when a corresponding layer of another one of the plurality of candidate kernels runs on the accelerator.

4. The method of claim 1, wherein a number of cores used to execute the neural network model among a plurality of cores comprised in the accelerator varies based on a resource situation of the accelerator in a run time.

5. The method of claim 1, wherein the allocating comprises:
   selecting, as the single candidate kernel, a single candidate kernel configured to maximize a utilization rate of the accelerator in a resource situation of the accelerator from among the plurality of candidate kernels; and
   allocating the selected single candidate kernel to a remaining resource of the accelerator.

6. The method of claim 1, wherein the status information of the accelerator comprises any one or any combination of resource use information of the accelerator, kernel information of a layer running on the accelerator, and information about a subsequent layer of the layer running on the accelerator.

7. The method of claim 1, wherein the allocating comprises selecting the single candidate kernel based on a determined occurrence or non-occurrence of a collision with a data access pattern of a layer of the model running on the accelerator and allocating the single candidate kernel to the accelerator.

8. The method of claim 7, wherein the allocating comprises:
   selecting, as the single candidate kernel, either one of
      a candidate kernel that meets quality of service (QOS) of either one of the layer running and a layer to run on the accelerator, and
      a candidate kernel, from among the plurality of candidate kernels, that has a least effect on the QoS in response to the occurrence of the collision; and
   allocating the selected single candidate kernel to the accelerator.

9. The method of claim 1, wherein the allocating comprises either one of:
   allocating the single candidate kernel in response to completing one of at least one layer of the neural network model running on the accelerator; and
   allocating the single candidate kernel in response to receiving a new request and executing a neural network model corresponding to the new request using a remaining resource of the accelerator.

10. The method of claim 1, wherein the allocating is performed by either one of a host processor configured to generate the plurality of candidate kernels and the accelerator that executes the neural network model.

11. The method of claim 1, wherein the allocating comprises allocating, as the single candidate kernel, a single candidate kernel that is selected from among the plurality of candidate kernels based on any one of a greedy scheme, an equal resource distribution scheme, an overall system performance prioritization scheme, and a power consumption minimization scheme.

12. The method of claim 1, wherein the accelerator comprises a plurality of cores and is configured to execute at least one neural network model.

13. The method of claim 1, further comprising generating at least a portion of an output feature map by running, using the accelerator, a layer of the neural network model based on the allocated single candidate kernel.

14. A non-transitory computer-readable record medium storing instructions that, when executed by one or more processors, configure the one or more processors to perform the method of claim 1.

15. A data processing apparatus comprising:
one or more processors configured to:
receive a request for executing a neural network model on an accelerator;
in response to receiving the request, generate a plurality of candidate kernels for each layer of a plurality of layers comprised in the neural network model;
execute the neural network model by allocating, to the accelerator, a single candidate kernel that is selected from among the plurality of candidate kernels for a layer to run on the accelerator based on corresponding kernel information and status information of the accelerator, including:
selecting the single candidate kernel from among the plurality of candidate kernels based on a required number of cores included in the corresponding kernel information and remaining number of available cores of the accelerator, wherein the required number of cores of the selected single candidate kernel is less than or equal to the remaining number of available cores of the accelerator and
allocating the selected single candidate kernel to the remaining number of available cores of the accelerator during a run-time; and
perform an inference operation associated with the request based on the executing the neural network model on the accelerator using the remaining number of available cores of the accelerator.

16. An electronic device comprising:
a host processor configured to receive a request for executing a neural network model on an accelerator and in response to receiving the request, generate a plurality of candidate kernels for each layer of a plurality of layers comprised in the neural network model; and
the accelerator configured to:
execute the neural network model by running a layer determined to be run based on a single candidate kernel that is selected from among the plurality of candidate kernels for the layer to run based on corresponding kernel information and status information of the accelerator, including:
selecting the single candidate kernel from among the plurality of candidate kernels based on a required number of cores included in the corresponding kernel information and remaining number of available cores of the accelerator, wherein the required number of cores of the selected single candidate kernel is less than or equal to the remaining number of available cores of the accelerator and
allocating the selected single candidate kernel to the remaining number of available cores of the accelerator during a run-time; and
perform an inference operation associated with the request based on the executing the neural network model on the accelerator using the remaining number of available cores of the accelerator.

17. The electronic device of claim 16, wherein the host processor is configured to generate the plurality of candidate kernels to run each layer using a different accelerator resource use amount.

18. A processor-implemented data processing method, the method comprising:
receiving a request for executing a first neural network model and a second neural network model on an accelerator;
in response to receiving the request, generating a plurality of candidate kernels for each layer of a plurality of layers of the first neural network model and the second neural network model;
running a kernel from the plurality of candidate kernels of the first neural network model on a number of cores of an available resource of the accelerator;
in response to a start of the running the kernel of the first neural network, running a kernel from the plurality of candidate kernels of the second neural network model on a remaining number of available cores of the accelerator, including:
selecting the kernel of the second neural network model from among the plurality of candidate kernels based on a required number of cores included in corresponding kernel information and the remaining number of available cores of the accelerator, wherein the required number of cores of the selected kernel is less than or equal to the remaining number of available cores of the accelerator and allocating the selected kernel of the second neural network model to the remaining number of available cores of the accelerator during a run-time;
generating one or more output feature maps based on the running of the kernel of the first neural network model and the running of the kernel of the second neural network model; and
performing inference operations based on executing the first neural network model and the second neural network model on the accelerator using the remaining number of available cores of the accelerator.

19. The method of claim 18, wherein the running of the kernel of the second model comprises running the kernel of the second neural network model in response to determining that a collision will not occur between memory access patterns during the running of the kernel of the first neural network model and the running of the kernel of the second neural network model.

20. The method of claim 18, wherein, for each of the kernel of the first neural network model and the second neural network model, the kernel is selected for running from among the plurality of candidate kernels based on kernel information including any one or more of:
a number of accelerator cores used to run the kernel;
a data reuse pattern including any one or more of a reuse of an input feature map, a reuse a weight, and a reuse of an output feature map in running the kernel; and
a tiling factor including a multi-dimensional data size of the kernel.

* * * * *